May 13, 1952      E. J. SOLTYSIK      2,596,346
TOOTHED SHOULDERED SPRING RETAINER CLIP
Filed Nov. 14, 1947
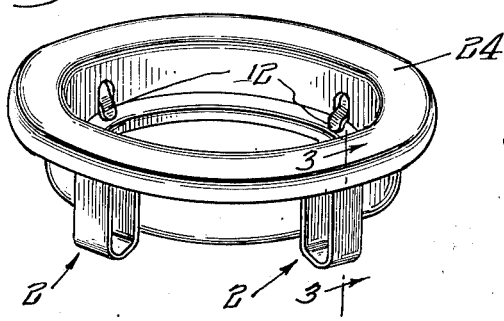
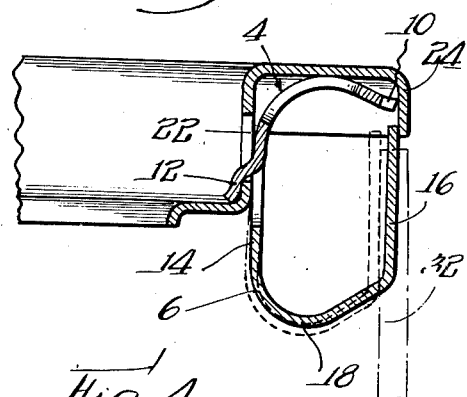
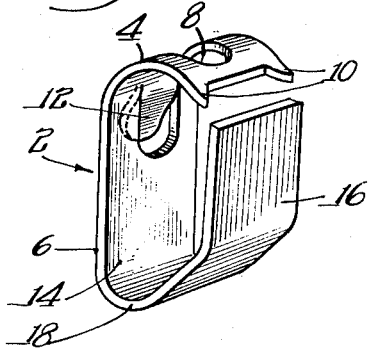
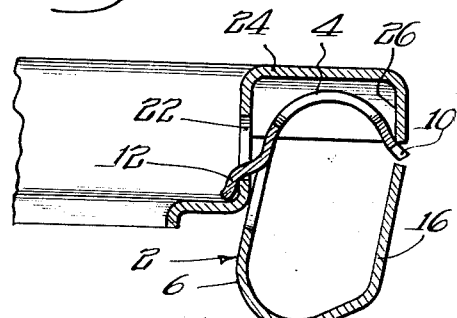
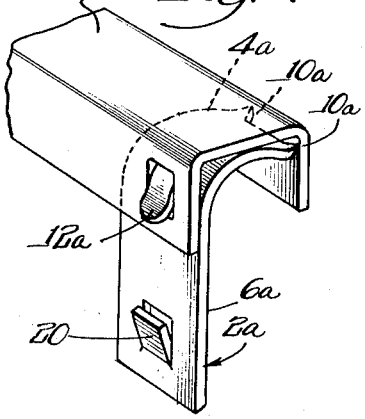
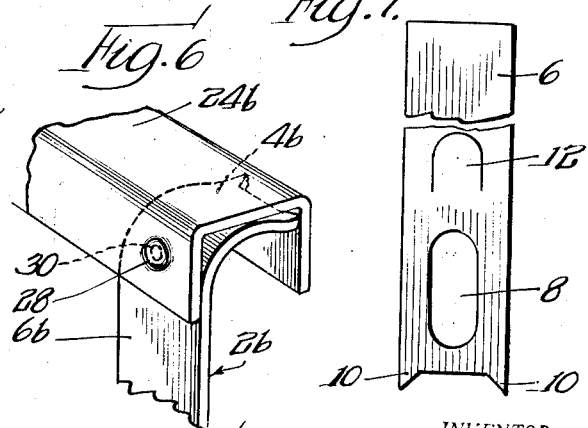
INVENTOR.
Edmund J. Soltysik
BY
Moore, Olson & Trexler
attys Patented May 13, 1952

2,596,346

UNITED STATES PATENT OFFICE 2,596,346

TOOTHED SHOULDERED SPRING RETAINER CLIP

Edmund J. Soltysik, Chicago, Ill., assignor to Illinois Tool Works, Chicago, Ill., a corporation of Illinois Application November 14, 1947, Serial No. 785,840

3 Claims. (Cl. 24—73)

This invention relates generally to an improvement in sheet metal fastening devices, and is directed more particularly to a one-piece sheet metal fastener for securing molding trim and other like objects to work pieces.

Various types of molding trim are used for decorative as well as functional purposes. In attaching these trims to the work piece it is necessary to provide a head which will positively engage the internal surface of the trim and a stud for engaging the work piece to anchor the attached trim thereto. The fasteners or clips are usually applied to the molding strip prior to the application of the strip to the work and the fasteners distributed in spaced relation along the molding trim to conform with the apertures provided in the work piece. Hence, it is important that the fastener head positively interlock with the molding to prevent any movement of the fastener relative to the molding after the fastener head is mounted therein.

The present invention contemplates a fastener of simple construction, yet designed to afford the strength and other structural and functional features desirable in such a fastener.

The fastener is produced from sheet material by well-known stamping and forming operations.

More specifically, the invention contemplates a one-piece fastener as set forth above having a resilient head provided with means to positively engage the internal surface of a molding trim or the like and provided with a shank depending therefrom for engaging a work piece for securement of the molding thereto.

It is a further object of the present invention to provide a fastener or clip of the type referred to above in which the head structure is adapted to engage different surfaces of a molding trim by engaging means formed thereon.

It is a further object of the present invention to provide a fastener or clip of the type referred to above which may be manufactured very inexpensively and is of extremely simple design.

It is a further object of the present invention to provide a fastener for molding trim with a head designed to prevent rotation of the fastener relative to the trim after attachment of the fastener to the trim.

Another object of the present invention is to provide a fastener which may be used with molding trims of a type not having inturned flanges for the head portion to engage, and to this end the invention contemplates a fastener having means adapted to positively engage the inner surfaces of a molding trim.

The foregoing and other objects and advantages will be more apparent after a reading of the following detailed description when considered in connection with the accompanying drawing wherein:

Figure 1 is a perspective view of one embodiment of the fastener;

Figure 2 is a perspective view of one embodiment of the fastener shown in assembled relation with the molding prior to application to a work piece;

Figure 3 is a sectional view of the fastener in assembled relation with the molding taken along the line 3—3 of Figure 2;

Figure 4 is a sectional view of the fastener similar to Figure 3 showing the fastener being positioned in the molding;

Figure 5 is a perspective view of a modified fastener;

Figure 6 is a perspective view of still another embodiment of the invention; and Figure 7 is a plan view of the blank of the fastener shown in Figure 1.

One embodiment of the invention is shown in perspective in Figure 1. It is designated generally by the numeral 2. The clip or fastener 2 includes a head structure 4 and a shank portion 6. It is apparent that the fastener 2 disclosed in Figure 1 may be produced from a single strip of stock and in the instant embodiment from stock of uniform width. The head 4 may be slotted or severed for a portion of its length, the slot 8 providing resiliency in the head 4 by elimination of stock. The size of the slot or severance 8 may be increased or decreased to give the desired resiliency. Teeth 10 are provided at the free end of head section 4, and as will be described later, are used for positive engagement of an internal surface of the trim or molding member into which the head 4 of the fastener 2 is mounted. Adjacent the other end of the head a finger 12 is struck and formed so as to extend beyond the surface of the head, thereby permitting the finger to be engaged in an aperture or the like provided on a surface of the trim molding member, as seen best in Figure 3.

The fastener is provided with a shank 6 depending from the head 4 which may be of any desirable construction. For purposes of disclosure a resilient shank portion 6 is shown comprised of two leg portions 14 and 16 which are joined to each other to form a nose portion 18. In the embodiment shown in Figure 1, leg 16 may be flexed relative to leg 14 for resiliency in mounting the fastener to a work piece. In Figure 3 the dotted lines show the position assumed by the resilient shank portion 6 upon its engagement with a work piece 32 shown in dot and dash lines. This type of shank is particularly useful where a plurality of fasteners are to be attached to a trim member 24 in the form of a channel-shaped member and the trim member associated with a large opening. The resiliency afforded by leg portion 16 permits easy insertion of a plurality of these fasteners into the apertured work piece 32 and the leg portion 16 being urged outwardly in tensioned position so as to afford a friction engagement with the work piece 32. In the event that the channel-shaped trim member 24 is not to be removed, shoulder means could be formed on leg 16 to engage a lip or aperture in the work piece 32 to accomplish such a result.

Figure 5 discloses a fastener 2a having a head portion 4a similar to that shown in the embodiment in Figure 1, but having a different shank portion 6a. This embodiment has been shown with the view of indicating that a plurality of different types of shanks might be employed with the fastener head of the instant invention and still come within the spirit of the invention. Shank 6a in the embodiment shown in Figure 5 is provided with a wing or lug 20 which is adapted to engage the under surface of the work piece when the fastener is inserted therein.

The manner in which the fastener of the instant invention is mounted in the article to be secured to a work piece will now be described. Figure 4 discloses the fastener 2 with the finger or shoulder portion 12 hooked into an aperture 22 in channel-shaped trim member 24 which has been provided for purposes of securing one side of the head 4 of the fastener to the trim 24. The head 4 of the fastener 2, as shown in Figure 4, is in ready position to be inserted into the channel-shaped trim member 24. Upon pressure being applied for the aforesaid purpose, the head 4, being resilient in construction, is flexed or compressed so as to permit its entry into the trim member which necessarily has a width of smaller dimension than the head of the fastener in an unflexed condition. In mounting the fastener to the trim, as above described, the finger 12 in the aperture 22 acts as a pivot to secure this side of the head portion 4 against removal as pressure is applied to the other end of the fastener head 4. The angle at which the teeth 10 are disposed along the free end margin of the head portion 4 permits readily the sliding of the teeth along the inner surface 26 of the trim member as the head portion 4 is inserted therein, the teeth thereupon resisting any effort of withdrawal. It will be obvious that the resiliency of the head portion 4 may be controlled, as previously disclosed, by the use of a severance 8. By this construction, the fastener head portion affords the forces necessary to cause the teeth to engage the material of the channel-shaped trim member 24. Furthermore, the angle at which the teeth 10 are disposed may be changed in order to satisfy the requirements of any particular problem of engagement. As previously indicated, the fastener in installed relation relative to the trim member is best seen in Figure 3.

Figure 6 discloses still another embodiment of the fastener coming within the spirit of the herein disclosed invention. The fastener 2b is shown in assembled relation to a channel-shaped trim member 24b and has a shank portion 6b with a head portion 4b extending at an angle therefrom in a manner similar to the embodiment shown in Figures 1 to 4, inclusive, and Figure 5. However, in place of the finger portion or shoulder 12 or 12a, as disclosed in the embodiments shown in Figures 1 to 4 and 5, respectively, a dimple 28 is provided in the channel-shaped trim member 24b and a corresponding complementary dimple 30 is provided on the head portion 4b of the fastener 2b. The manner of application of the head portion 4b of the fastener to the channel-shaped trim member 24 is similar to previously disclosed embodiments with the exception that the complementary dimple portions 28 and 30 of the channel-shaped trim member 24b and the head portion 4b, respectively, are engaged prior to the insertion of the remainder of the head portion into the channel-shaped trim member 24b. Such a construction permits the trim member to have a solid construction, that is, no perforations would be necessary for the attachment of the fastener and would be desirable in certain types of installations.

Figure 7 is a representation of the blank from which the embodiment shown in Figures 1 to 4, inclusive, is formed. It should be noted that the embodiment disclosed is made from a strip of material uniform in width with the severance or aperture 8, the finger portion 12 and the teeth 10 disclosed in their respective positions. While the invention is not to be construed as limited to such an embodiment, this blank indicates the simplicity with which the instant device may be manufactured.

From the foregoing it is obvious that the present invention provides a fastener or clip which may be produced very economically from sheet material and is of extremely simple structural form. Further, the present invention may be used in instances where the molding strip is made of relatively resilient stock in which case little resiliency in the head of the fastener need be provided since the flexing of the molding would permit insertion of the fastener head therein for positive engagement therewith.

It is to be understood that numerous variations for accomplishing the desired object of this invention might be employed and that it is not to be limited to any of the above-described embodiments which contemplate broadly the idea of carrying out the objects of the instant invention. Various changes and modifications, therefore, may be made without departing from the scope of the invention or sacrificing any of its material advantages.

What is claimed is:

1. A one-piece double-ended sheet metal fastener formed from strip material and adapted for attaching a channel-shaped member to a complementary work piece, and comprising a resilient head arched to present an outwardly facing convex portion facilitating its insertion within the channel-shaped member, one side of the head presenting a free extremity of the strip and having teeth extending outwardly from said free extremity adapted to impinge a side wall of the channel-shaped member in a direction substantially normal to said wall, a leg portion extending from the opposite side of said arched head, a hook spaced outwardly of the leg portion and opening away from said head and extending outwardly from the juncture of the head and stud for passage through a recess in the side wall of the channel-shaped member opposite to the side wall engageable by the aforesaid teeth, said resilient arched head cooperating to urge said teeth into impingement with the adjacent side wall of the channel-shaped member for positively positioning the head therein, and fastening means on said leg portion projecting out of the plane thereof for attaching the fastener to the work piece.

2. A one-piece double-ended sheet metal fastener as claimed in claim 1, wherein the fastening means includes a flexible extension of the leg portion reversely bent relative thereto and having a free extremity extending toward said head.

3. A one-piece double-ended sheet metal fastener as claimed in claim 1, wherein the fastening means is in the form of a lug stuck outwardly from the leg portion and presenting a free end extending toward said head.

EDMUND J. SOLTYSIK.

REFERENCES CITED

The following references are of record in the file of this patent:

UNITED STATES PATENTS

| Number | Name | Date |
|---|---|---|
| 2,091,791 | Newman | Aug. 31, 1937 |
| 2,105,706 | Stamy | Jan. 18, 1938 |
| 2,141,700 | Tinnerman | Dec. 27, 1938 |
| 2,148,847 | Wiley | Feb. 28, 1939 |
| 2,148,848 | Wiley | Feb. 28, 1939 |
| 2,153,972 | Murphy | Apr. 11, 1939 |
| 2,187,869 | Tobin | Jan. 23, 1940 |
| 2,208,727 | Marshall | July 23, 1940 |
| 2,216,219 | Wiley | Oct. 1, 1940 |
| 2,504,986 | Kost | Apr. 25, 1950 |
| 2,511,808 | Petri | June 13, 1950 |